Oct. 11, 1949.   J. E. MULHEIM   2,484,241
VIBRATION DAMPER FOR DYNAMOELECTRIC MACHINES
Filed Nov. 28, 1947

WITNESSES:
E. A. McCloskey
Rev. C. Groome

INVENTOR
Joseph E. Mulheim.
BY
ATTORNEY

Patented Oct. 11, 1949

2,484,241

UNITED STATES PATENT OFFICE 2,484,241

VIBRATION DAMPER FOR DYNAMO-ELECTRIC MACHINES

Joseph E. Mulheim, Lima, Ohio, assignor to Westinghouse Electric Corporation, East Pittsburgh, Pa., a corporation of Pennsylvania Application November 28, 1947, Serial No. 788,505

9 Claims. (Cl. 171—209)

The present invention relates to vibration damping means, and more particularly to a tuned vibration damper for devices, such as dynamoelectric machines, which are mounted on vibrating supporting structures, such as internal combustion engines.

The damping means of the present invention is particularly adapted for use on aircraft generators, although it will be obvious that its usefulness is not restricted to this particular application, and that it may be used on other devices which are subjected to severe vibration. Aircraft generators, which supply the electrical loads on airplanes, are usually mounted on a pad on the crankcase of a main engine of the airplane, and driven by a power takeoff shaft geared to the crankshaft of the engine. In the usual arrangement, a mounting flange on the end bracket at one end of the generator is bolted to the pad, and the other end of the generator is unsupported. When the engine is running, the vibration of the engine is transmitted directly to the generator, and the generator is therefore subjected to severe vibration in operation. Different modes of vibration may occur but it has been found that the most severe vibration is approximately elliptical. In many cases, the two axes of the elliptical path are nearly equal so that the actual motion of the mounting pad and the generator is in a substantially circular path.

If the frequency of this vibration transmitted to the generator coincides with, or is close to, the natural frequency of vibration of the generator about its axis, the amplitude of the generator vibration builds up to relatively large values, and this large amplitude of vibration causes severe stresses in the mounting pad and crankcase of the engine, and in the mounting flange and end bracket of the generator. The stresses caused in this way may become large enough to overstress the engine crankcase or the generator bracket and, in some cases, have resulted in structural failure of these parts. The possibility of this resonant condition between the engine vibration and the generator natural frequency cannot readily be forseen and avoided, for the reason that the frequencies of engine vibration are usually not known at the time the generator is designed, and generators of the same design may be used on different engines of different vibration characteristics. Some other means must be provided, therefore, for minimizing or reducing the effects of vibration in order to keep the stresses in the generator and the engine crackcase within safe limits.

The principal object of the present invention is to provide a tuned vibration damper which is adapted to be mounted on a device, such as a dynamoelectric machine, supported on a vibrating supporting structure, in order to reduce the amplitude of vibration of the device.

Another object of the invention is to provide a tuned vibration damper which is adapted to be mounted on a device, such as a dynamoelectric machine, supported on a vibrating supporting structure, and which is effective to damp vibration of the device in any direction about its axis, and to reduce the amplitude of vibration.

Still another object of the invention is to provide a dynamoelectric machine which is adapted to be mounted on a vibrating supporting structure, such as an internal combustion engine, and which is provided with tuned vibration damping means to reduce the amplitude of vibration of the machine.

A further object of the invention is to provide a dynamoelectric machine, such as an aircraft generator, which is adapted to be mounted at one end on a vibrating supporting structure, such as an internal combustion engine, with the other end unsupported, and which has tuned vibration damping means at the unsupported end to reduce the amplitude of vibration and thus to reduce the stresses in the machine and in the supporting structure.

Other objects and advantages of the invention will be apparent from the following detailed description, taken in connection with the accompanying drawing, in which.

Figure 1:
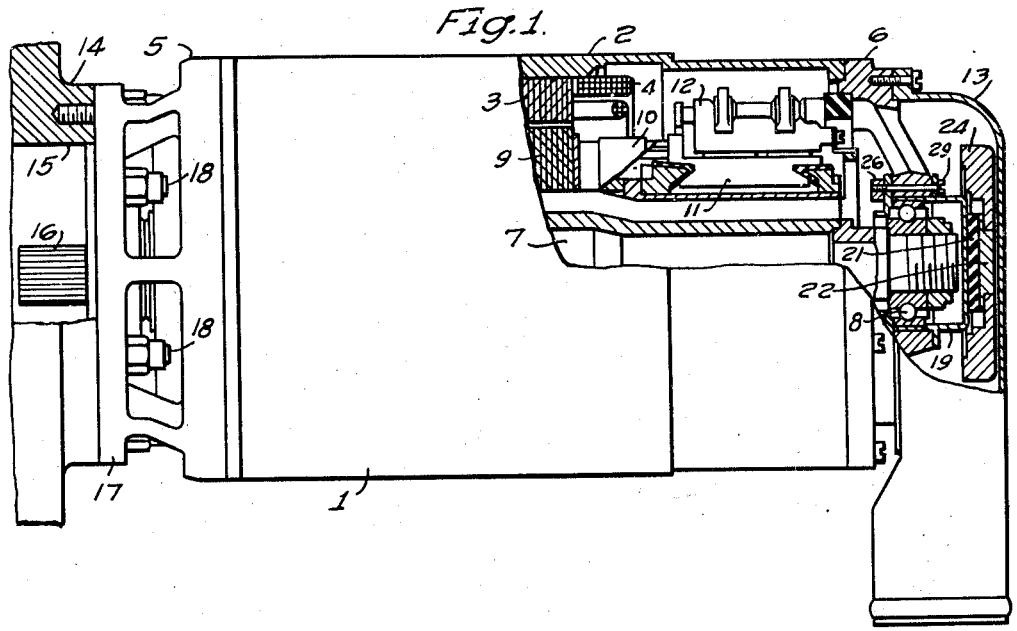
Figure 1 is a side view, partly in longitudinal section, showing an aircraft generator embodying the invention.

The invention is illustrated in Fig. 1 applied to a direct-current aircraft generator 1 of more or less typical construction. The generator 1 has a stator member which includes a frame 2 on which are mounted pole pieces 3 carrying field windings 4. The frame 2 is closed at one end by an end bracket 5, and at the other end by an end bracket 6. The generator 1 also has a rotor member including a hollow shaft 7 supported in bearings 8 in the end brackets 5 and 6. An armature core 9 is mounted on the shaft 7 and carries armature windings 10, which are connected to a commutator 11 on the shaft 7. Suitable brush rigging 12 is mounted on the stator of the machine. An air shield or hood 13 is secured to the end bracket 6 and adapted for connection to a blast tube, or other means for supplying a blast of cooling air to the generator 1.

The generator 1 is adapted to be mounted on a pad 14 on the crankcase of an airplane main engine, or other internal combustion engine. The pad 14 is shown as having a central bore 15 through which the splined drive shaft 16 of the generator 1 extends for connection to a driving shaft in the engine. The end bracket 5 of the generator 1 has a mounting flange 17, which fits on the pad 14 and is secured to it by means of bolts 18, so that the generator 1 is rigidly secured to the pad 14 at one end while the other end is left unsupported. When the driving engine is running, the vibration of the engine is transmitted to the generator 1 because of its rigid connection to the pad 14, and the generator is therefore subjected to severe vibration. As previously stated, it has been found that the most severe vibration is in a substantially elliptical or circular path about the axis of the generator, that is, about the axis of the shaft 7. If the frequency of the vibration transmitted to the generator coincides with, or is close to, the natural frequency of vibration of the generator about its axis, the amplitude of vibration of the generator builds up to relatively high values, which causes severe stresses in the mounting pad 14 and in the end bracket 5, and these stresses may become high enough to overstress these parts and cause structural failure, as well as causing other damage to the generator, such as breakage of leads.

Figure 2:
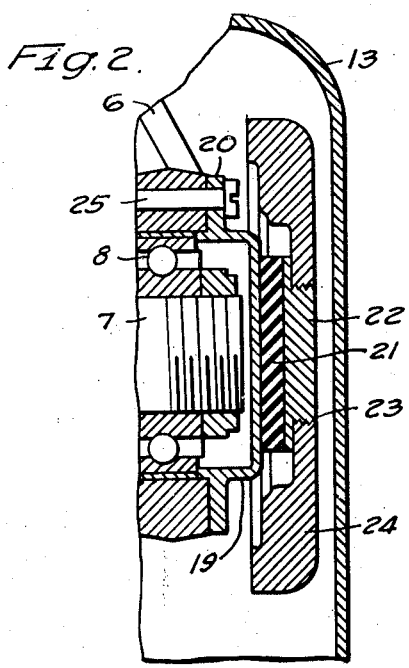
Fig. 2 is a fragmentary, enlarged, longitudinal sectional view of the right-hand end of Fig. 1, showing the damping means.

In accordance with the present invention, the generator 1 is provided with damping means to reduce the amplitude of the generator vibration, and thus keep the stresses in the mounting pad and generator within safe limits. In the preferred embodiment of the invention shown in Figs. 1 and 2, the damping means is mounted on the end bracket 6 of the generator, within the air shield 13. The damping means includes a circular metal mounting member 19, which may have a flange portion 20 mounted on the generator bracket. A spring member consisting of a circular disc-shaped element 21 of resilient material is secured to the mounting member 19. The resilient element 21 may be made of natural rubber or of a synthetic elastomeric material having suitable damping characteristics and oil resistance, and it is preferably bonded directly to the mounting member 19. A circular weight support 22 is bonded to the other side of the resilient element 21. The weight support 22 has a central reduced portion which is externally threaded, as indicated at 23, and a weight member 24 is threaded on the reduced portion of the weight support. The weight member 24 has a central opening, which is internally threaded to engage the threads 23, and it has a relatively thick annular rim portion which extends axially over the resilient element 21 and the mounting member 19.

The mounting member 19 of the damper may be secured to the end bracket 6 of the generator 1 in any suitable manner, preferably with the resilient element 21 and weight member 22 coaxial with the shaft 7 of the generator. As shown in the drawing, the support member 19 may be secured to the end bracket 6 by means of the screws 25 which hold the bearing cap 26 in place, although any other means of mounting the damper in place may be utilized.

The damper is tuned, by proper selection of the resilient characteristics of the spring element 21 and the weight of the weight member 24, to a frequency such that the amplitude of vibration of the generator at its natural frequency is reduced sufficiently to keep the stresses in the generator and mounting pad within safe limits, but without unduly increasing the amplitude of vibration at other frequencies. In general, a tuned damper is most effective if it is tuned to a frequency slightly less than the natural frequency of the device to which it is applied for the particular mode of vibration which is to be damped. If this optimum value of damper natural frequency is used in the present instance, however, it is found that the amplitude of generator vibration at certain lower frequencies, below the generator natural frequency, may be objectionably increased, and in order to prevent this effect, the damper is tuned to a somewhat lower frequency than the theoretical optimum value. If the damper is tuned to a frequency within the range of 85% to 95% of the natural frequency of the generator, it is effective to materially reduce the amplitude of generator vibration at its natural frequency but without unduly increasing the amplitude of vibration at other frequencies. Thus, by the use of a tuned damper, which is tuned to a frequency somewhat below the natural frequency of the generator, and preferably in the range indicated above, the stresses in the generator and mounting pad are kept within safe limits when the vibration transmitted to the generator is at, or close to, the natural frequency of the generator, which is the most severe condition, while the stresses, and other adverse effects, due to vibration at other frequencies are not objectionably increased.

It will be apparent that various modifications may be made in the structure described. Thus, the damper may be mounted on any stationary part of the machine, preferably, but not necessarily, coaxial with the shaft, and preferably as close to the unsupported end of the machine as possible, so as to have the maximum damping effect. The weight support 22 and weight member 24 might be made a single integral member bonded to the resilient element 21, if desired, although the two-piece construction illustrated is preferred because it permits molding the parts together, thus obtaining a stronger bond.

Figure 3:
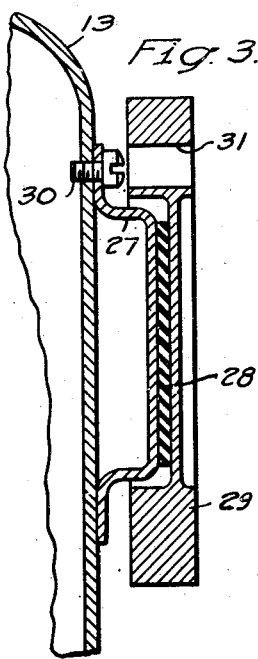
Fig. 3 is a fragmentary sectional view similar to Fig. 2, showing a modified embodiment of the invention.

A modified embodiment of the invention is illustrated in Fig. 3, in which the damper is mounted on the outside of the air shield 13, and in which a somewhat different construction of the damper itself is shown. In this embodiment the damper includes a mounting member 27, which may be similar to the mounting member 19 previously described. A circular disc-shaped resilient element 28, of natural or synthetic rubber, is bonded concentrically to the mounting member 27, and a circular weight member 29 is bonded to the other side of the resilient element 28. The weight member 29 has a relatively thin central portion, which is bonded to the resilient element 28, and a relatively thick, annular rim portion which extends axially over the mounting member 27. The weight member 29 is designed so that its center of gravity lies in the plane of the bonded joint between the weight member and the resilient element to minimize bending stresses in the bond. The diameter of the mounting member 27 and the inside diameter of the rim portion of the weight member 29 are made such that the amplitude of vibration of the weight member 29 is limited to a desired value by engagement of the weight member with the mounting means, in order to limit the shearing stresses in the resilient element 28. It will be apparent that these same features could also be included in a damper of the construction shown in Fig. 2 by suitable design of the weight member 24. The damper of Fig. 3 is shown as being mounted on the outside of the air shield 13 by means of screws 30, which are accessible through holes 31 in the rim portion of the weight member 29. It will be understood, of course, that this damper might equally well be mounted on the end bracket of the generator within the air shield, in the manner shown in Fig. 2, and that the damper of Fig. 2 might, if desired, be mounted on the outside of the air shield 13, as in Fig. 3.

It should now be apparent that a tuned damping means has been provided which is adapted for mounting on a dynamoelectric machine, or other device which is subject to vibration, to reduce the amplitude of vibration, and thus to keep the stresses in the machine within safe limits. The damper is effective in all directions about the axis of the machine to which it is applied, and thus it is well suited for use on aircraft generators to damp vibration in a substantially circular path. It will be apparent that various other modifications of this device may be made within the scope of the invention. Thus, if desired, the mounting members 19 and 27 might be dispensed with, and the resilient element, or spring member, of the damper bonded directly to the air shield 13 or to any other suitable supporting surface of the generator 1.

It is to be understood, therefore, that although certain specific embodiments of the invention have been shown and described for the purpose of illustration, the invention is not limited to the specific details of construction shown, but in its broadest aspects, it includes all equivalent embodiments and modifications which come within the scope of the appended claims.

I claim as my invention:

1. A dynamoelectric machine having mounting means at one end for mounting the machine on a supporting structure, a circular disc-shaped element of resilient material secured on a stationary part of the machine at the other end thereof, and a circular weight member secured directly to said resilient element concentrically thereof.

2. A dynamoelectric machine having mounting means at one end for mounting the machine on a supporting structure, a circular disc-shaped element of resilient material secured on a stationary part of the machine at the other end thereof, and a circular weight member secured directly to said resilient element concentrically thereof, said weight member and resilient element having a natural frequency of vibration somewhat less than the natural frequency of vibration of the machine about its axis.

3. A dynamoelectric machine having mounting means at one end for mounting the machine on a supporting structure, a circular disc-shaped element of resilient material secured on a stationary part of the machine at the other end thereof, and a circular weight member secured directly to said resilient element concentrically thereof, said weight member and resilient element having a natural frequency of vibration which is between 85% and 95% of the natural frequency of vibration of the machine about its axis.

4. A dynamoelectric machine having mounting means at one end for mounting the machine on a supporting structure, a mounting member secured to a stationary part of the machine at the other end thereof, a circular disc-shaped element of resilient material secured to said mounting member, and a circular weight member secured directly to the resilient element concentrically thereof, said weight member having a relatively thick annular rim portion which extends axially over the mounting member, said resilient element and weight member having a natural frequency of vibration about the axis of the machine which is between 85% and 95% of the natural frequency of vibration of the machine about its axis.

5. An electric generator adapted to be mounted on and driven by an internal combustion engine, said generator having a stator member and a rotor member, mounting means at one end of the stator member for mounting the generator on a driving engine, and vibration damping means on the stator member at the other end thereof, said vibration damping means comprising a circular disc-shaped resilient element secured on the stator member, and a circular weight member secured directly to the resilient element concentrically thereof, said resilient element and weight member having a natural frequency of vibration about the axis of the generator somewhat less than that of the generator.

6. An electric generator adapted to be mounted on and driven by an internal combustion engine, said generator having a stator member and a rotor member, mounting means at one end of the stator member for mounting the generator on a driving engine, and vibration damping means on the stator member at the other end thereof, said vibration damping means comprising a circular disc-shaped resilient element secured on the stator member, and a circular weight member secured directly to the resilient element concentrically thereof, said resilient element and weight member having a natural frequency of vibration about the axis of the generator which is between 85% and 95% of the natural frequency of the generator.

7. An electric generator adapted to be mounted on and driven by an internal combustion engine, said generator having a stator member and a rotor member, mounting means at one end of the stator member for mounting the generator on a driving engine, and vibration damping means on the stator member at the other end thereof, said vibration damping means comprising a circular mounting member secured to the stator member, a circular disc-shaped resilient element secured to the mounting member, and a circular weight member secured directly to the resilient member concentrically thereof, said weight member being of larger diameter than the mounting member and having a relatively thick annular rim portion which extends axially over the mounting member, and said resilient element and weight member having a natural frequency of vibration about the axis of the generator which is between 85% and 95% of the natural frequency of the generator.

8. A vibration damping device for mounting on a machine which is subject to vibration, said damping device comprising a circular mounting member adapted to be secured to said machine, a circular resilient element secured coaxially to said mounting member, and a circular weight member secured coaxially to said resilient element, the weight member being of larger diameter than the mounting member and having a relatively thick annular rim portion which extends axially over the mounting member to limit the radial amplitude of the vibration of the weight member.

9. A vibration damping device for mounting on a machine which is subject to vibration, said damping device comprising a circular mounting member adapted to be secured to said machine, a solid disc of resilient material bonded to said mounting member, and a circular weight member bonded to said resilient disc, the resilient disc and the weight member being concentric with the mounting member.

JOSEPH E. MULHEIM.

REFERENCES CITED

The following references are of record in the file of this patent:

UNITED STATES PATENTS

| Number | Name | Date |
|---|---|---|
| 1,819,665 | Wiltse | Aug. 18, 1931 |
| 1,834,860 | Morrill | Dec. 1, 1931 |
| 2,368,537 | Gilbert | Jan. 30, 1945 |
| 2,380,770 | McFarland | July 31, 1945 |

FOREIGN PATENTS

| Number | Country | Date |
|---|---|---|
| 400,957 | Great Britain | Nov. 2, 1933 |
| 477,831 | Germany | June 14, 1929 |

OTHER REFERENCES

Elements of Mechanical Vibrations, Freberg and Kemler, John Wiley & Sons, New York city, New York, 1943, pages 105 and 106.